(12) United States Patent
Landry et al.

(10) Patent No.: US 10,133,973 B2
(45) Date of Patent: Nov. 20, 2018

(54) TWO DIMENSIONAL BARCODE

(71) Applicant: SCANTRUST SA, Lausanne (CH)

(72) Inventors: Paul Landry, Ecublens (CH); Justin Picard, St Sulpice (CH)

(73) Assignee: SCANTRUST SA, Lausanne (CH)

( * ) Notice: Subject to any disclaimer, the term of this patent is extended or adjusted under 35 U.S.C. 154(b) by 0 days.

(21) Appl. No.: 15/735,026

(22) PCT Filed: Jun. 3, 2016

(86) PCT No.: PCT/IB2016/053268
§ 371 (c)(1),
(2) Date: Dec. 8, 2017

(87) PCT Pub. No.: WO2016/199004
PCT Pub. Date: Dec. 15, 2016

(65) Prior Publication Data
US 2018/0157946 A1    Jun. 7, 2018

(30) Foreign Application Priority Data

Jun. 11, 2015   (EP) ..................... 15171681

(51) Int. Cl.
*G06K 19/06*     (2006.01)
*G06K 1/12*      (2006.01)
(52) U.S. Cl.
CPC ....... *G06K 19/06037* (2013.01); *G06K 1/121* (2013.01)
(58) Field of Classification Search
CPC .................. G06K 19/06037; G06K 1/121
USPC ................................ 235/487, 494
See application file for complete search history.

(56) References Cited

U.S. PATENT DOCUMENTS

| 4,864,112 | A | * | 9/1989 | Imai | G06K 7/10881 |
| | | | | | 235/462.01 |
| 5,825,947 | A | * | 10/1998 | Sasaki | G06K 19/06037 |
| | | | | | 382/321 |
| 5,854,478 | A | * | 12/1998 | Liu | G06K 7/14 |
| | | | | | 235/462.27 |
| 6,070,805 | A | * | 6/2000 | Kaufman | G06K 7/14 |
| | | | | | 235/462.04 |
| 6,556,690 | B1 | | 4/2003 | Nelson | |
| 6,814,291 | B1 | * | 11/2004 | Cordery | G06K 7/14 |
| | | | | | 235/462.01 |

(Continued)

FOREIGN PATENT DOCUMENTS

JP      2009-025992      2/2009

OTHER PUBLICATIONS

International Search Report for PCT/IB2016/053268 dated Aug. 31, 2016, 3 pages.

(Continued)

*Primary Examiner* — Paultep Savusdiphol
(74) *Attorney, Agent, or Firm* — Nixon & Vanderhye P.C.

(57) ABSTRACT

Two dimensional barcode (4) for placement on a portion of a neck (3) of a bottle (1), comprising a top edge (10a), a bottom edge (10b), a left edge (10c) a right edge (10d), and code elements (8) arranged along horizontal lines extending between the left edge and the right edge, wherein the horizontal lines of code elements and the top and bottom edges are curved such that the top edge has a convex shape and the bottom edge a concave shape.

15 Claims, 10 Drawing Sheets

(56) References Cited

U.S. PATENT DOCUMENTS

| | | | | |
|---|---|---|---|---|
| 7,380,717 B2* | 6/2008 | Lubow | ................. | G06K 1/121 |
| | | | | 235/462.01 |
| 8,292,182 B1* | 10/2012 | Peng | ................. | G06K 7/10762 |
| | | | | 235/385 |
| 8,542,289 B1* | 9/2013 | McClatchie | ........... | H04N 5/247 |
| | | | | 348/211.11 |
| 2005/0150957 A1* | 7/2005 | Lubow | ................. | G06K 1/121 |
| | | | | 235/462.01 |

OTHER PUBLICATIONS

Written Opinion of the ISA for PCT/IB2016/053268 dated Aug. 31, 2016, 5 pages.

* cited by examiner

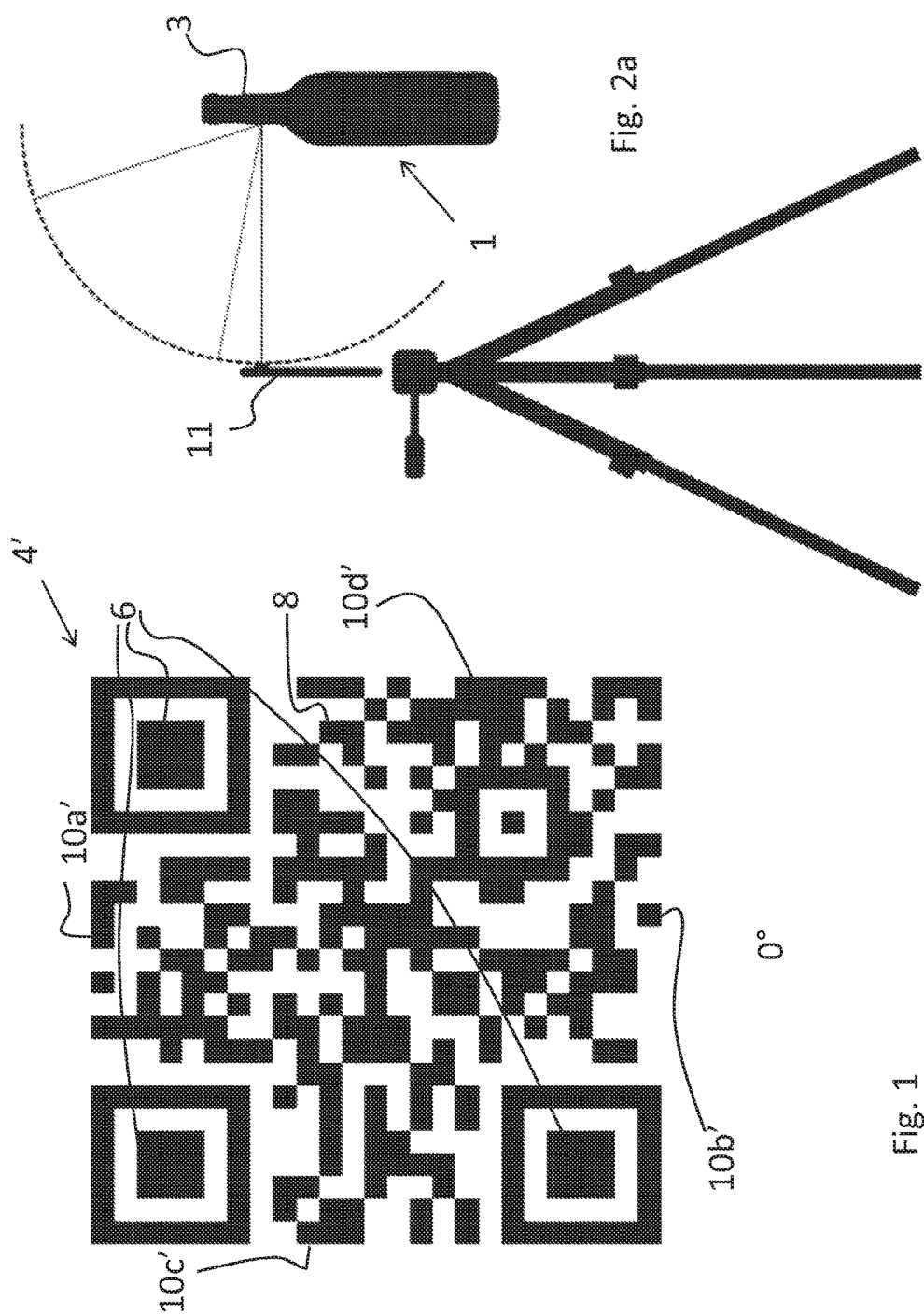

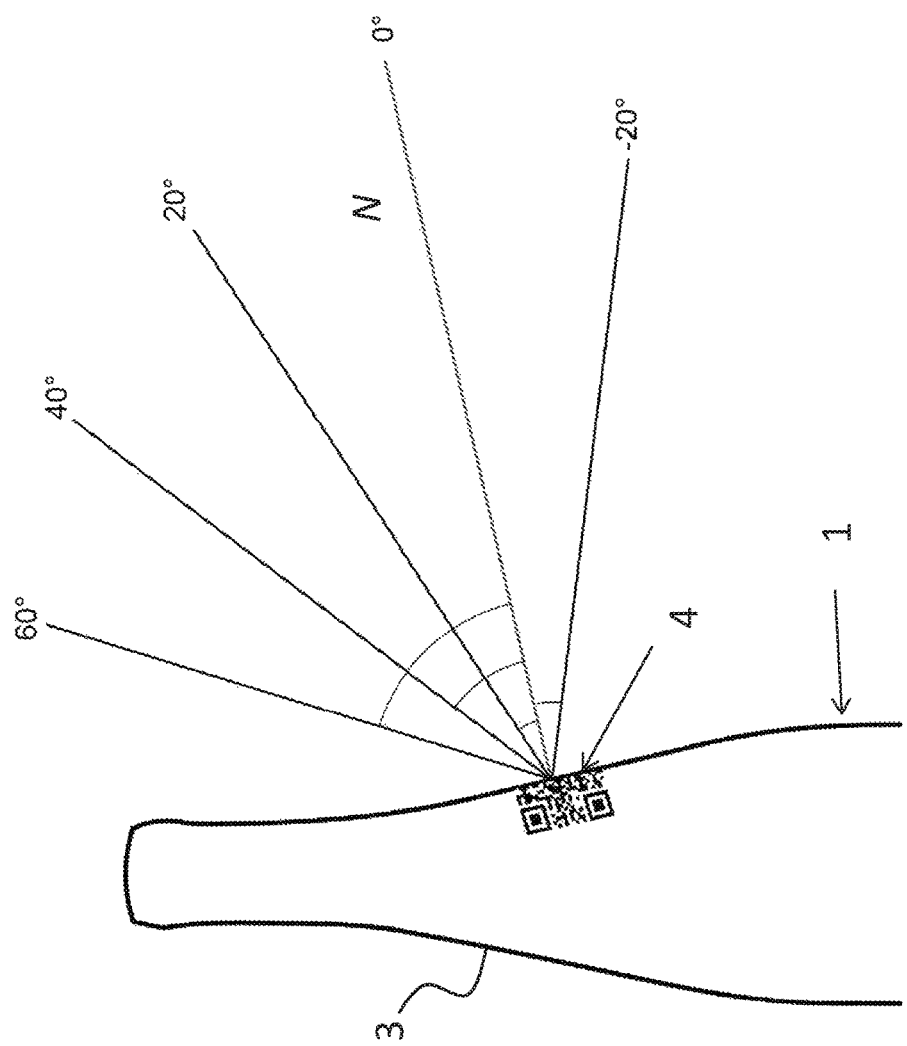

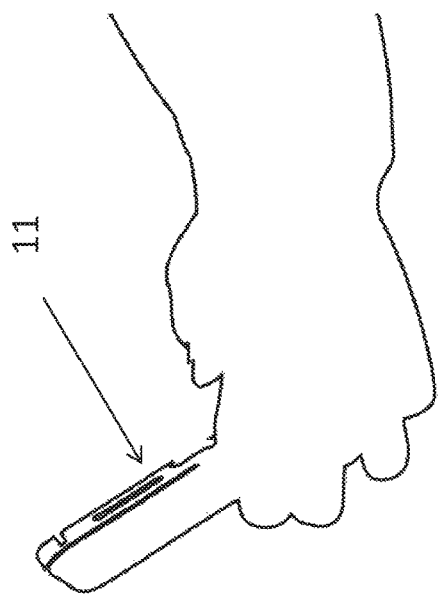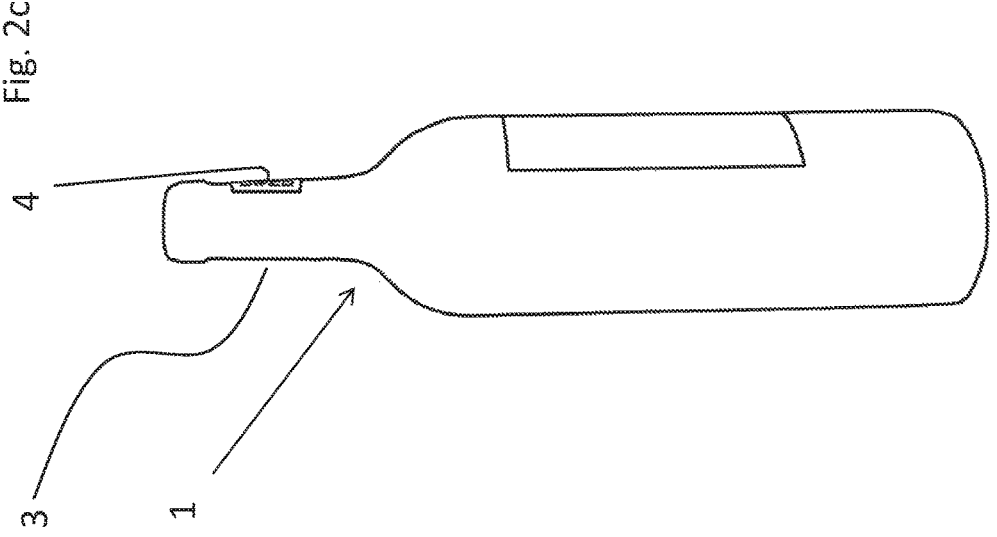
Fig. 2c

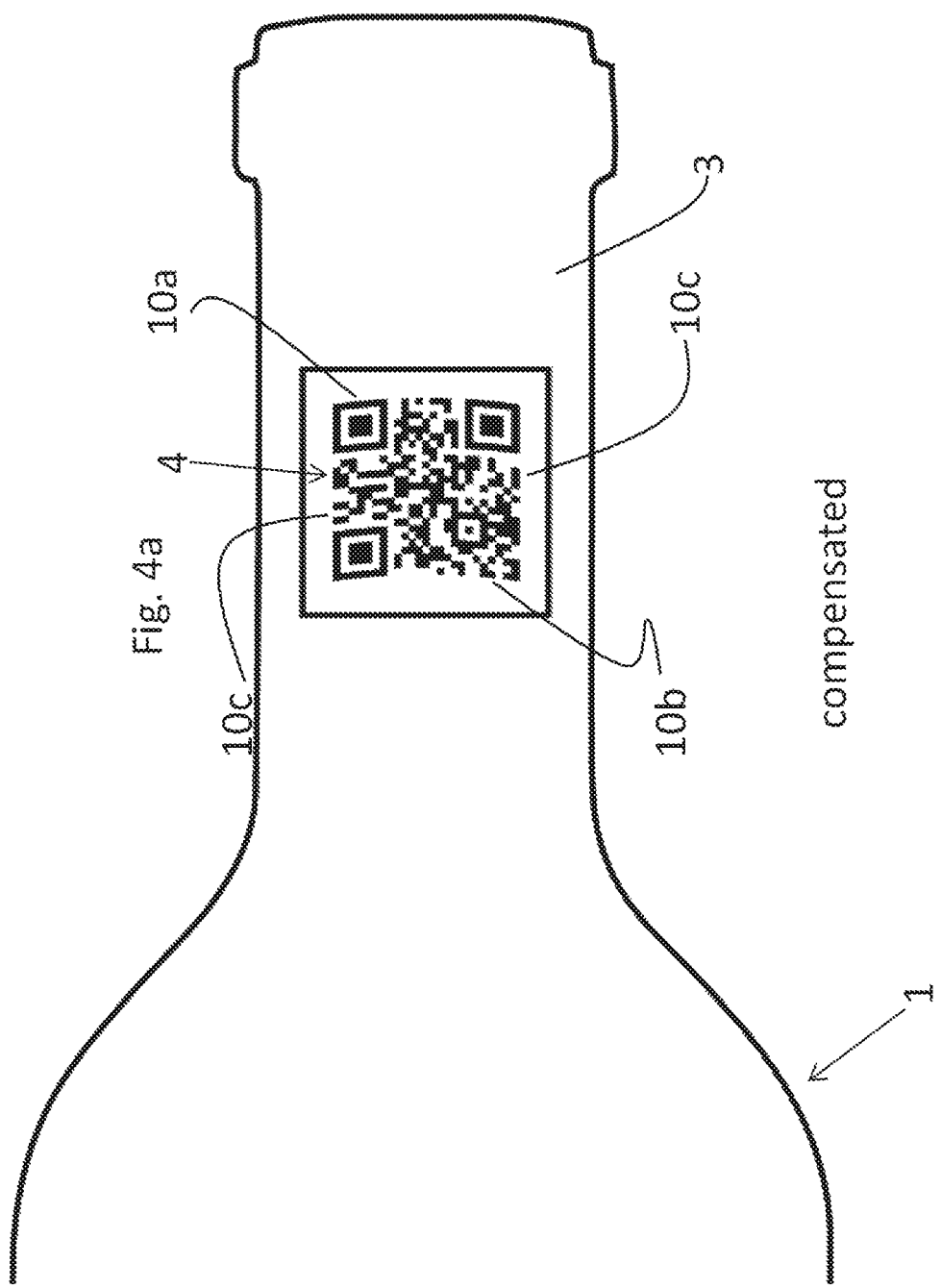

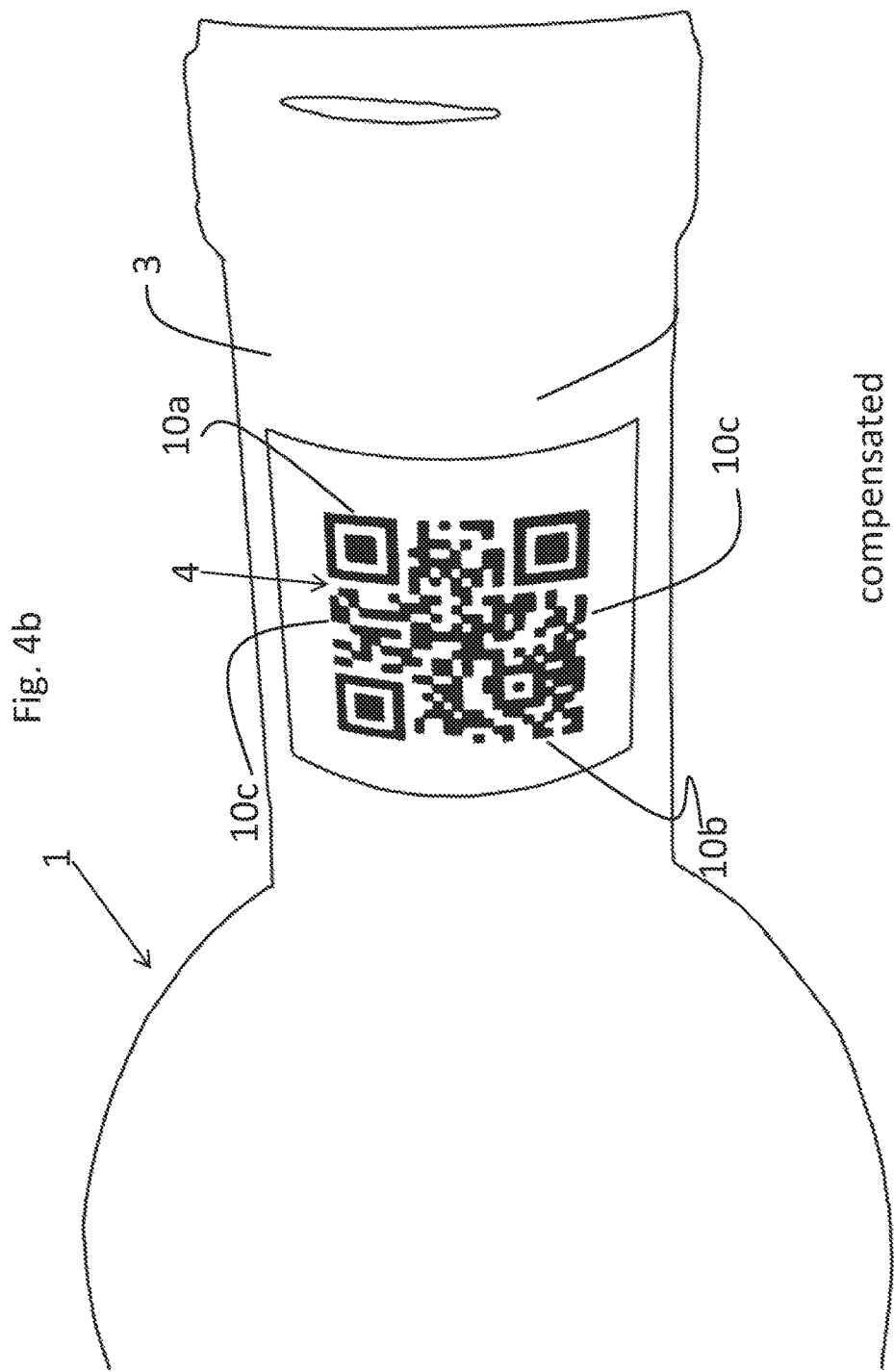

40°  Fig. 5d
30°  Fig. 5c

Fig. 6
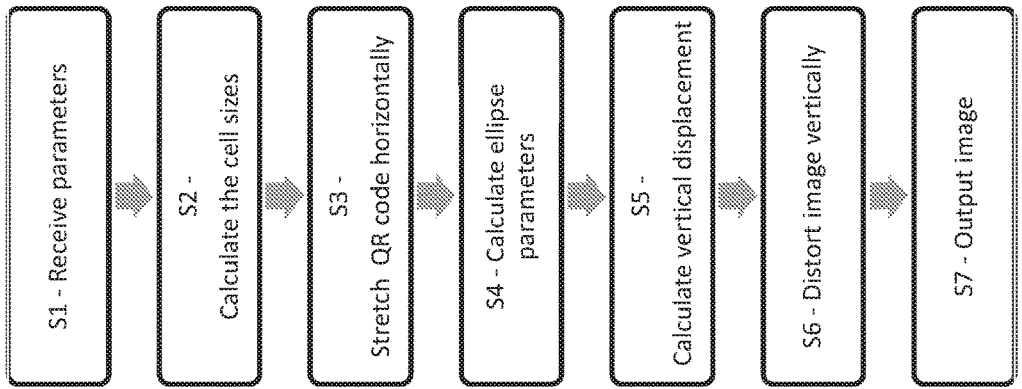
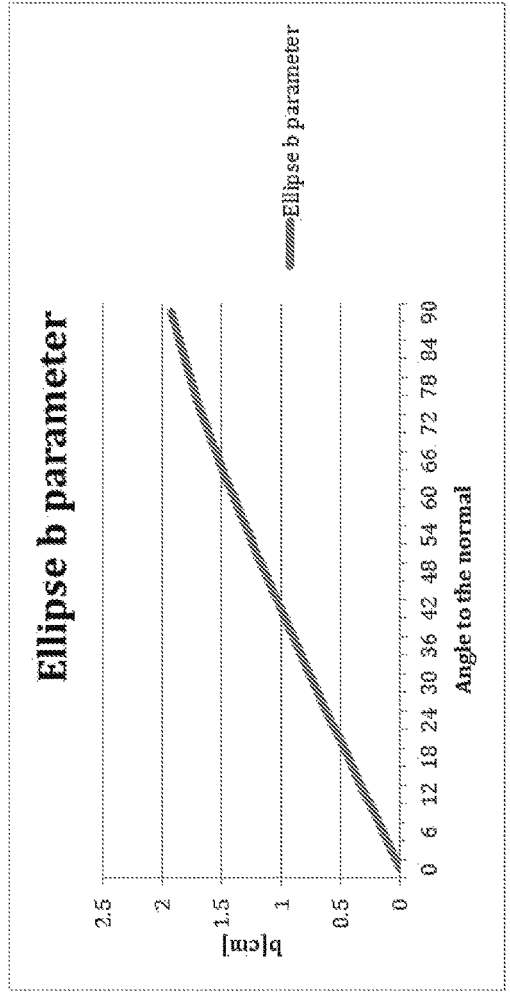
Fig. 7

TWO DIMENSIONAL BARCODE

This application is the U.S. national phase of International Application No. PCT/IB2016/053268 filed Jun. 3, 2016 which designated the U.S. and claims priority to EP 15171681.8 filed Jun. 11, 2015, the entire contents of each of which are hereby incorporated by reference.

The present invention relates to a two dimensional barcode and process of generating a 2D barcode (also commonly called a QR code).

It is well known that 2D Barcode reading can be challenging, because of printing and scanning conditions. In some cases, printing and scanning may be done in overall good conditions, however the difficulty of reading a 2D barcode increases when the 2D barcode is applied on a non-planar surface, and the decoder cannot be optimized for such conditions.

The four alignment patterns on QR Codes allow the codes to be decoded with a strong perspective angle. Indeed, the position of four reference points is sufficient to reconstruct the original image from potentially any perspective transform. FIG. 1 shows an example of a 2D barcode scan that is easily decoded with a standard QR Code scanning application on an Android phone. However, when the QR Code is placed on a non-planar surface, for example on a cylindrical surface with relatively small radius (if the radius is high, a perspective transform may be a good enough approximation for decoding), decoding generally become much less reliable.

Codes are increasingly applied near the top of wine or spirits bottles, which is in most cases a cylindrical surface of small radius. Indeed, such codes are often placed on tamper-evident labels, which protect the bottle against counterfeiting. As the label breaks during opening, it cannot be reused on a refilled bottle. Also, these codes are often used as part of marketing campaigns, and by being placed near the top of the bottle they are more easily noticed by the consumer, and therefore more likely to be scanned.

Consumers need to be able to scan 2D barcodes with the software applications that they use on a daily basis installed on a portable electronic device, for instance on a smartphone. For instance, WeChat, a widely used messaging application in China, is equipped with a QR Code scanner, and a large proportion of 2D barcode scans in China is made through this application installed on the user's smartphone. However, such applications are not optimized to decode 2D barcodes on non-planar surfaces such as cylinders.

In the prior art, various techniques have been developed to optimize the reading of codes. For example U.S. Pat. No. 6,814,291 proposes a method of reading a two-dimensional barcode symbol that is susceptible to distortion, by using template matching techniques. A drawback with such technique is the need to modify the decoder, which limits the applications that can be used.

The application of anamorphosis to conform images to planar, cylindrical, conical, and parabolic surfaces is well developed. The degree of pre-distortion of an image that is necessary for such surfaces can be developed by applying known geometric principles. Even more advanced techniques, such as in U.S. Pat. No. 7,555,157, transform graphical images such that they are adapted to be applied to a three-dimensional topography of a substrate to which the image is to be applied. After the image is applied to the substrate, the image conforms to the topography of the substrate. While very powerful, such techniques are not adapted to the specificities of 2D barcode decoding.

Techniques have also been developed to reduce predictable printer defects by modifying the digital data being sent to the printer to pre-compensate for the defects—see for instance U.S. Pat. No. 6,005,670 and U.S. Pat. No. 6,341,020.

Attempts to address the problem of reading barcodes on cylindrical surfaces can be found in CN102682266 and in U.S. Pat. No. 8,292,182. In CN102682266, a continuous image acquisition of a rotating barcode is proposed. In U.S. Pat. No. 8,292,182, the barcode rotates with the cylindrical element in the scanning area of a reader in order for the reader to completely read the barcode. These techniques are for reading barcodes on cylindrical surfaces during the manufacturing process, but these do not address the problem of reading barcodes on a cylindrical surface by a standard image scanner.

In U.S. Pat. No. 4,864,112 a unidimensional barcode adapted for a cylindrical surface is disclosed. The technique adopted therein is not intended for a 2D barcode and moreover the reading direction is assumed to be in a plane essentially orthogonal to the barcode surface. Other barcode reading techniques relevant to reading barcodes on cylindrical surfaces are disclosed in U.S. Pat. No. 6,556,690, U.S. Pat. No. 5,854,478, WO2005067533, U.S. Pat. No. 7,555,157.

In view of the aforegoing, it is an object of this invention to provide a 2D barcode that is more easily readable with standard portable image scanners, when the 2D barcode is placed on a non-planar surface such as a cylinder.

It is advantageous to provide a 2D barcode that is adapted for placement and optimal scanning with standard or simple portable scanners on a cylindrical, conical or round neck of a bottle, such as a wine bottle.

Objects of the invention have been achieved by providing a 2D barcode according to claim 1 and a method of generating an image of a two dimensional barcode for placement on a curved surface such as a portion of a neck of a bottle according to claim 14.

The inventors have realized the one of the difficulties of decoding a 2D barcode placed near the top of a bottle with many scanners and applications stems from user behavior. Consumers and other users have a tendency to scan by placing their smartphone higher than the bottle, facing down at an angle with respect to the surface of the 2D barcode. And if the LED light of the smartphone is active, which is needed in low light environment, the specular reflection which arises may make scanning very difficult or impossible if the scan is made without an angle. The invention improves the reliability of scanning by optimizing the shape of the 2D barcode to take into account both the specificities of the non-planar surface, and the conditions in which the scanning takes place, in particular typical user behaviour.

Disclosed herein is a two dimensional barcode for placement on a portion of a neck of a bottle, the barcode comprising a top edge, a bottom edge, a left edge (a right edge, and code elements arranged along horizontal lines extending between the left edge and the right edge. The horizontal lines of code elements and the top and bottom edges are curved such that the top edge has a convex shape and the bottom edge a concave shape, whereby the top edge is defined as the edge closest to the scanner or viewpoint. A top edge may therefore represent a lower edge if the 2D code bar is configured to be read from below rather than above the code bar. The meaning of the terms "top", "bottom", and "horizontal" in relation to the 2D barcode of the present description is thus intended to be relative to the intended scan viewing/reading position and not an actual absolute position or direction.

In an embodiment, the curve of the lines of code elements and the top and bottom edges is shaped substantially as a portion of an ellipse.

In an embodiment, the bottom edge is longer than the top edge.

In an embodiment, the degree of curvature of the lines of code elements and the top and bottom edges is configured for a diameter of the portion of the neck of the bottle, a greater curvature being provided for a smaller diameter.

In an embodiment, the 2D barcode comprises a support on which the code elements are printed.

The support may comprise an adhesive layer on a side of the support opposite a side on which the code elements are printed. The support may be made of or comprise paper or a flexible polymer layer.

In an embodiment, each of the top, bottom, right and left edges have a length inferior to 26 mm.

In an embodiment, the two dimensional barcode comprises a global deformation described by the following formula:

$$s = \frac{\frac{2d^2}{h}\sin(\beta)}{\left(\frac{d}{h}\right)^2 \sin(\beta)^2 - \cos(\beta)^2}$$

where:
s is the 2D barcode's physical printed height, h is the perceived height of the 2D barcode, d is the distance from a pre-defined scanner view point, and
$\beta=\pi/2-\alpha$, where $\alpha$ is the angle between a normal N to the surface of the 2D barcode and said pre-defined scanner view point.

The perceived height h of the 2D barcode 2D may be determined according to the following formula:

$$h = \frac{2rd^2\sin(\beta)}{d^2 - r^2\cos(\beta)^2}$$

where r is the 2D barcode's physical half-size, d is the distance from the view point and $\beta=\pi/2-\alpha$ ($\alpha$ is the angle from the normal to the surface and the view point).

Also disclosed herein is a bottle comprising a two dimensional barcode as set forth herein, wherein the two dimensional barcode is bonded on a portion of the neck of the bottle.

In an embodiment, the portion of the neck of the bottle is substantially cylindrical.

In an embodiment, the portion of the neck of the bottle is substantially conical.

In an embodiment, the portion of the neck of the bottle is substantially conically and concavely curved.

In an embodiment, the two dimensional barcode is placed on a base portion of the neck of the bottle distal from a pouring end of the neck of the bottle.

Also disclosed herein is a method of generating an image of a two dimensional barcode for placement on a curved surface such as a portion of a neck of a bottle comprising the following steps executed by an algorithm in a computing system:

(S1)—receiving from a memory in the computing system or from an external computing system or from manual input of data into the computing system, or any combination thereof, dimensional parameters of a two dimensional barcode prior to deformation and an input image of said two dimensional barcode prior to deformation, (S2)—calculating elementary cell sizes of the code elements so that the code element is visually perceived as a square when viewed from the predefined viewing angle taking into account the diameter of the curved surface (S3)—stretching, by means of an algorithm, the input image horizontally by scaling horizontally cells of a bit matrix of the 2D barcode according to sizes that correspond to column positions of said cells in the bit matrix, whereby cells at horizontal ends of the barcode are larger than the cells in the middle of the barcode, (S4)—calculating ellipse deformation parameters that correspond to the intersection of a plane at the viewing angle with curved surface, (S5)—calculating vertical displacements of pixels of the image based on the calculated ellipse deformation parameters, (S6)—distorting the stretched input image based on the ellipse deformation parameters and the vertical displacement, (S7)—outputting the image of said two dimensional barcode for generating a printing file.

In step S3 each cell may also be scaled vertically, preferably by a fixed factor obtained by dividing the perceived vertical size of the 2D barcode by the number of rows of an initial bit matrix defining the rows and column of the code elements.

Further objects and advantageous features of the invention will be apparent from the claims, from the detailed description, and annexed drawings, in which:

FIG. 1 is an illustration of a conventional 2D barcode;

FIG. 2a is a schematic illustration of a measurement setup to test a 2D barcode on a bottle according to an embodiment of the invention;

FIG. 2b is a side view of a portion of a bottle with a 2D barcode according to an embodiment of the invention;

FIG. 2c is an illustration of a user taking a scan of a 2D barcode according to an embodiment of the invention with a portable smartphone;

FIGS. 4a and 4b are illustration of a 2D barcode according to an embodiment of the invention on a neck of a bottle from a zero viewing angle (FIG. 4a) and a typical user viewing angle (FIG. 4b);

FIGS. 5a-5d are illustrations of a 2D barcode according to embodiments of the invention with different degrees of elliptical deformation for viewing angles of 10° (FIG. 5a), 20° (FIG. 5b), 30° (FIG. 5c), 40° (FIG. 5d);

FIG. 6 is a flow diagram illustrating a method of generating a 2D barcode according to an embodiment of the invention;

FIG. 7 is a graph illustrating a relationship between an elliptical deformation and a viewing angle, where the half parameter of the ellipse depends on the formula:

$$b=d/2(r \sin \beta)/(d+r \cos \beta)$$

Figure 8A:
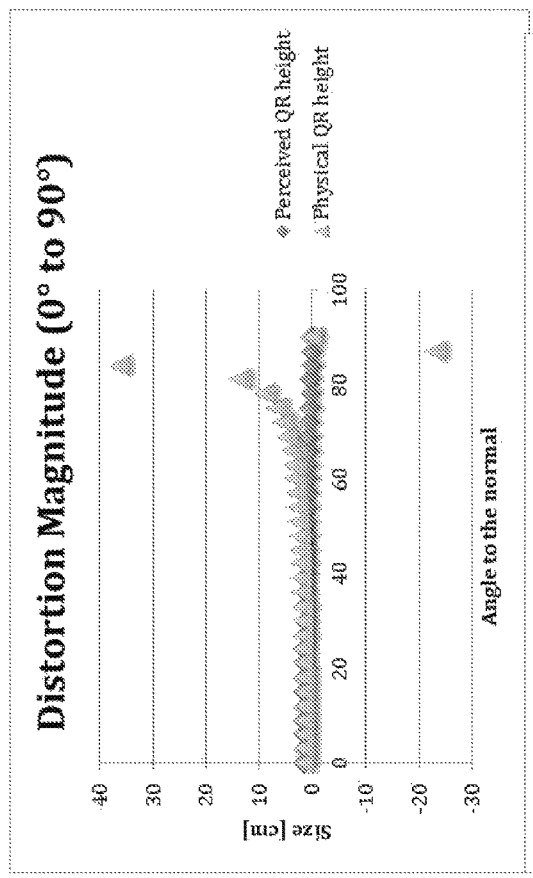
Figure 8B:
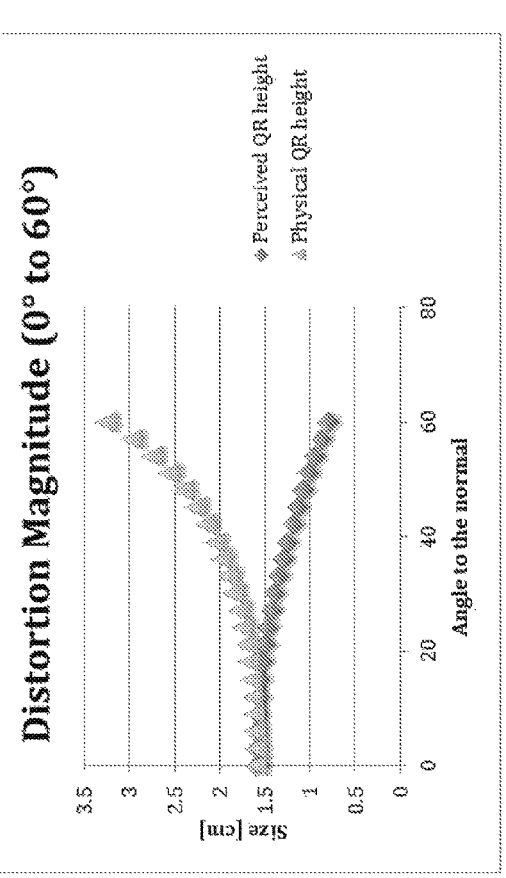

where b is the ellipse's vertical parameter, r is the diameter of the circle (diameter of the bottleneck), d is the distance from the view point to the border of the circle and β=π/2−α, α being the angle from the normal to the surface and the view point [NB: in the present test case r=3.85, d=10];

FIGS. 8a and 8b are graphs illustrating a magnitude of distortion involved either when viewing a 2D barcode with a fixed printed size from different angles (the perceived size changes, diamond shaped points) or needed to obtain a code with a fixed perceived size at different angles (the physical size changes, triangular points).

Referring to the FIGS. 4a-5d, an exemplary embodiment according to an embodiment of the invention is schematically illustrated. For 2D barcodes placed on cylindrical, conical or curved bottle necks, common 2D barcode sizes typically range from 25 mm×25 mm to 10 mm×10 mm, for instance 16 mm×16 mm.

The reading of standard 2D barcodes 4' (illustrated in FIGS. 1 and 3) applied on the neck of a bottle 1 is affected by two different kinds of deformations: physical distortions to the label/paper caused by curvatures in the bottleneck and perspective transformation caused by the viewing angle. These two factors explain why reading normal 2D barcodes on circular or cone-shaped surfaces creates additional challenges. A generic correction deformation method can allow the reading of 2D barcodes at higher angles, though this comes with a compromise on the lower angles. As will be seen in relation to the examples of embodiments of the invention presented herein, different known scan image readers show similar results, which demonstrates the coherent and generic aspect of the 2D barcode according to the invention. In particular the invention 2D barcode increases significantly the ease of use of various commonly available consumer scanning software applications.

Referring to FIGS. 2b to 4b, a printed 2D barcode 4 is positioned on a portion of a neck 3 of a bottle 1. The 2D barcode is printed on a label that is bonded with an adhesive to the surface 5 of the neck. The label may be made essentially of paper, polymer or other flexible printable materials provided with an adhesive layer to bond to the bottle surface. Within the scope of the invention, the 2D barcode may also be printed or engraved directly on the surface 5 of the bottle. The bottle may be made of glass, ceramic, polymer, or various other materials used for producing recipients, in particular bottles for containing liquids for human consumption. The invention is particularly well suited for 2D barcode labels bonded to the neck portions of wine and liquor bottles. The neck 3 of the bottle 1 may have various shapes, ranging from cylindrical to conical to essentially conical with a convex or concave curved portion.

It is advantageous to place the 2D barcode on the neck of the bottle to improve visibility to a consumer and access for scanning. In some instances manufacturers prefer to place the 2D barcode at the base 7 of the neck or on a curved or conical portion of the neck that is on average inclined slightly upwardly, in particular where the normal N (i.e. perpendicular) to the surface 5 is at an angle greater than zero, for instance in the range of 10° to 35° with respect to the horizontal plane H. User's may obtain information on the product and access promotional material issued by the manufacturer or seller of the product. The 2D barcode may also serve to verify authenticity of the product.

QR codes are a frequently used type of 2D barcode and usually comprises positioning marks 6 at corners of the barcode that form reference points that serve to orient the reading of the barcode. A 2D barcode comprises code elements 8 in the form of black and white essentially square or rectangular elements that are per se well known and need not be further described. Conventional 2D barcodes as illustrated in FIG. 1 may have an overall square or rectangular boundary 10 formed by a top edge 10a', a bottom edge 10b', a left side edge 10c', and a right side edge 10d'. The code elements 8 are arranged along horizontal code lines and vertical code lines, whereby the sequence of black and white elements along a code line represent a portion of the code to be read.

A user may scan the 2D barcode with a portable scanning device 11, typically the user's smartphone 11, whereby users usually scan a 2D barcode on a bottle neck from a position above the 2D barcode and incline their camera down towards the 2D barcode as best illustrated in FIG. 2c. This leads most users to position the camera's centre axis C at a viewing angle α relative to the normal N of the bottle neck surface that is non-zero, typically in a range of 10° to 40°.

According to an aspect of the invention, in order to improve the readability of the scanned 2D barcode, the horizontal code lines of the 2D barcode are deformed such that the top edge 10a and bottom edge 10b are curved upwards, namely the top edge has a convex shape and the bottom edge has a concave shape when seen from a position above the top edge 10a. The curved horizontal code lines extending between the left and right side edges 10c, 10d compensate for some or all of the deformation, from the perspective of a non-zero viewing angle α relative to the normal N of the surface of the 2D barcode, and taking into account the curvature of the bottle neck.

Figure 3:
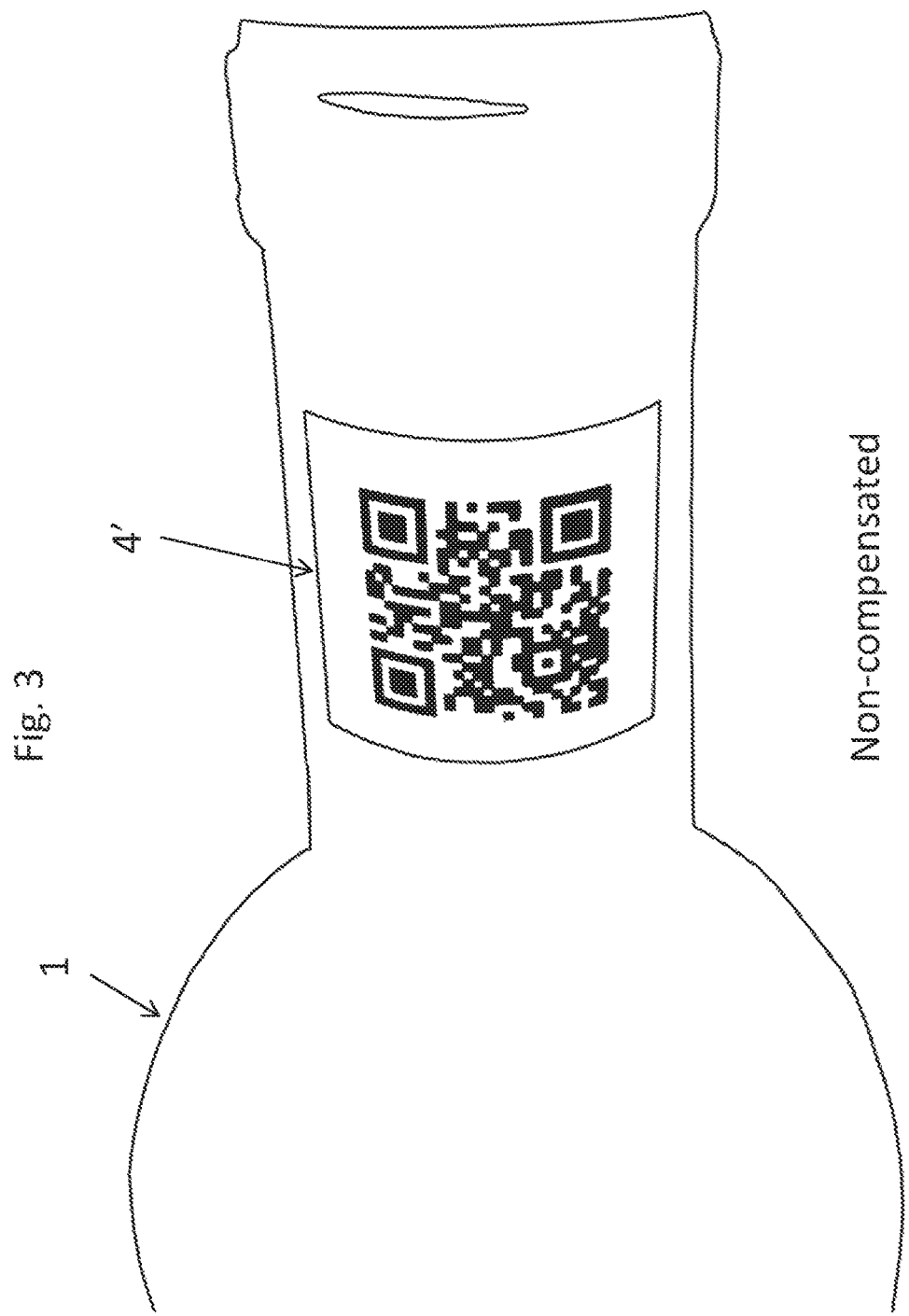
FIG. 3 is an illustration of a conventional 2D barcode on a neck of a bottle from a typical user viewing angle.
Figure 5B:
Figure 5A:
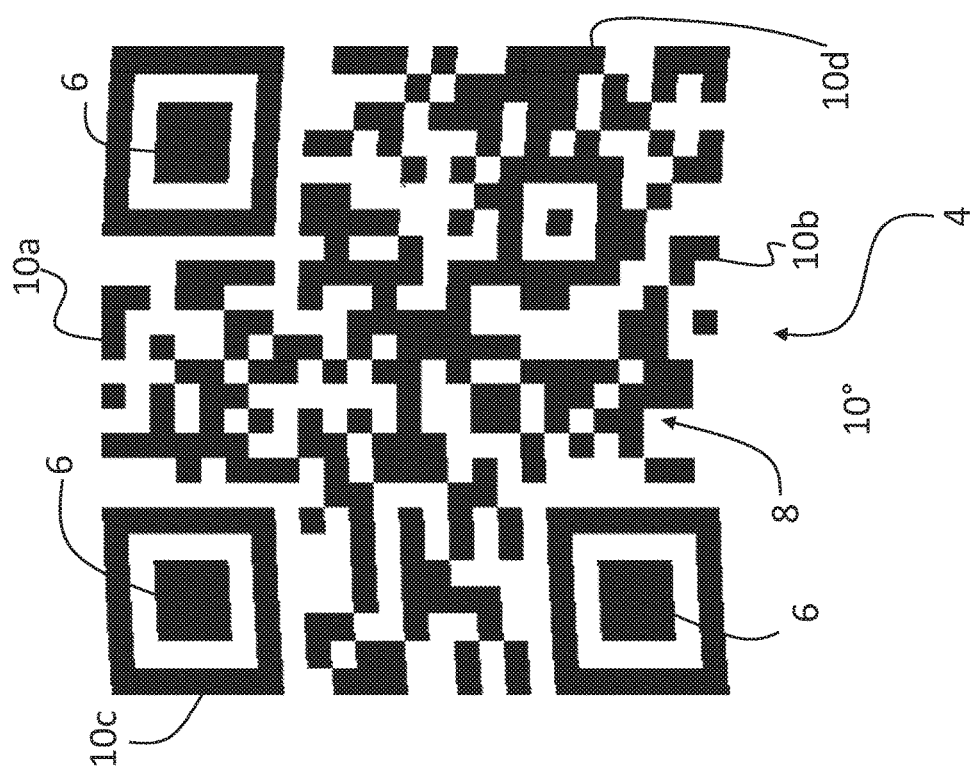

FIG. 3 illustrates a view of a conventional 2D barcode from the perspective of a non-zero viewing angle α relative to the normal N of the surface of the 2D barcode, whereby the top and bottom edges 10a', 10b' are seen as curved due to the curvature of the bottle neck.

FIG. 4a illustrates a view of a 2D barcode according to an embodiment of the invention from the perspective directly normal N to the surface of the 2D barcode, whereby the top and bottom edges 10a, 10b are seen as curved, however when viewed from the perspective of a non-zero viewing angle α as illustrated in FIG. 4b, the curvature of the top and bottom edges appear less curved and at a specific angle appear straight. The reduced curvature at the typical scanning angle improves the readability of the scanned 2d barcode.

The curvature of the horizontal code lines of the 2D barcode may be varied according to the curvature of the neck of the bottle on which it is intended to be bonded, namely to the diameter of the neck of the bottle.

In an embodiment (not shown), the curvature of horizontal code lines may vary between the top edge 10a and bottom edge 10b such that the curvature of the top edge 10a is different to the curvature of the bottom edge 10b, for placement on a non-cylindrical bottle neck portion, for instance conical, concave or convex bottle neck portion, to take into account the different diameters at the positions of the 2D barcode between the top and bottom edges. The curvatures of the top edge and curvature of the bottom edge may thus be configured to generate the same degree of reduction of the curvature at a pre-defined non-zero viewing angle α taking into account a varying diameter of bottle neck between the top and bottom edges.

In an embodiment (not shown), the length of the top edge 10a may be shorter than the length of the bottom edge 10b for placement on a conical or generally conical (concavely or convexly curved) bottle neck portion, to take into account the different diameters at the positions of the 2D barcode at the top and bottom edges. The lengths of the top edge and of the bottom edge may thus be configured to reduce the deviation angle of the side edges 10c, 10d from parallelism, at a pre-defined non-zero viewing angle α, taking into account the greater diameter of bottle neck at the bottom edge compared to the top edge.

An advantage of a non-perpendicular camera viewing angle is the avoidance of reflection from the scanned surface. In effect, encouraging a user to scan a 2D barcode with the camera axis aligned with the Normal N of the surface may lead to difficulties in reading the code due to reflection from the scanned surface. By encouraging the user to scan with the camera axis at a non-zero angle with respect to the Normal N, undesirable reflection from the scanned area is avoided.

When placed on a flat surface, scanning apps can in general detect 2D barcodes scanned up to 60° from the normal. But when placed on a cylindrical or cone-shaped surface, the 2D barcodes are affected by different kinds of deformations: surface based and perspective distortions.

The first source is the physical distortion of the surface. A picture taken of a normal 2D barcode, from the normal to the surface at the 2D barcode's center, will not have the same width and height proportion. This effect is due to the curvature of the portion of the bottle on which the 2D barcode is placed and depends on the diameter of that portion as well as the size of the code. The closer the 2D barcode size is to the bottle portion diameter, the greater the distortion will be. When viewed from different vertical angles, this wrapping around the bottleneck produces essentially elliptical deformations of the printed straight code lines. These non-projective transformations are one of the main causes for the non-detectability of the 2D barcodes. Indeed, the 2D barcode's detection method is based upon finding specific black and white sequences along straight code lines.

Moreover, on a cone, the curvature of the support depends on the position on the vertical axis. Therefore, the elliptical distortions of the codes will also depend on the position on the vertical axis. On a cylinder, a normal 2D barcode will globally have symmetrical reading-angle limits, for instance if the maximum reading angle is 15° (from the surface normal) then its minimum reading angle will be −15°. This is because the elliptical deformations will be symmetrical. However, on a cone this doesn't apply anymore because of the curvature difference. The minimum reading angle will be greater than the maximum reading angle, because the deformation will be smaller at the base of the cone (smaller curvature). This effect is clearly visible, for example, a 1.6×1.6 cm QR code applied to a first test bottle reads on average from −22° to 18°. Correcting for an elliptical deformation will affect the symmetry of the physical printed code, and affect the symmetry and size of the reading range.

The second type of distortion comes from the perspective transformation caused by the viewing angle (assuming the code is scanned from the front, thus with no lateral angle). Perspective distortions of the horizontal code lines on cylindrical or conical support surfaces result in essentially elliptical distortions. Compensating for it implies adding a fair amount of distortion to the pre-printing code. Because the deformations depend on the viewing angle, compensation will work well for a given angle range but add distortions for angles outside of the angle range and therefore reduces the range of the 2D barcode readable angles.

To better understand what is implied, consider the following. From a perspective point of view, looking at the center of a 2D barcode from a different angle generates a global y-axis deformation (of the entire 2D barcode) described by the following formula:

$$h = \frac{2rd^2 \sin(\beta)}{d^2 - r^2\cos(\beta)^2}$$

where h is the perceived height of the 2D barcode, r is the 2D barcode's physical half-size, d is the distance from the view point and β=π/2−α (α is the angle from the normal to the surface and the view point).

In order to create a 2D barcode with a fixed perceived size for a certain angle to better manage the distortion, a global deformation described by the following formula may be applied:

$$s = \frac{\frac{2d^2}{h}\sin(\beta)}{\left(\frac{d}{h}\right)^2 \sin(\beta)^2 - \cos(\beta)^2}$$

where s is the 2D barcode's physical printed height, h is the perceived height of the 2D barcode, d is the distance from the view point and β=π/2−α (α is the angle from the normal to the surface and the view point).

Examples and Tests

Let us assume the 2D barcode is either a version 1 (21×21) or a version 2 (25×25) with error level Q (or M) using the alphanumeric data set (45 characters). We shall further consider two different bottles where the necks have a substantially cone-shaped portion on which the 2D barcode will be applied.

The first bottle tested has a 1.6 cm vertical section ranging from 4.14 cm diameter to 3.57 cm diameter. This produces a cone with a base diameter of 4.14 cm and a height of 11.56 cm, which is described by the following formula:

$$x^2 + y^2 = \frac{r^2(h-z)^2}{h^2}$$

for 0≤z≤h
where r=2.07 and h=11.56 cm. The normal to the surface therefore has a $\tan^{-1}(r/h)$=10.15° angle with the floor.

The first test bottle's cone section is defined by a base radius of r=2.135 cm and a height of h=8.87 cm, thus it has a 13.53° angle with the floor.

Measurements & Set-Up

A subset of the distorted codes (corresponding to different viewing angles) were printed and stuck onto a standard or commonly available bottle of wine. Using one of the most efficient QR readers presently on the market (i-nigma), a series of scans were taken to determine the readable angle range for those codes and thus reduce the search range for the other readers. The measurements were made on a vertical arc of a circle of radius r=10 cm around the codes' center. The reading limits were then determined by increasing/decreasing the angle. The limits for the other readers were then determined by conducting a search around the previously found limits.

The two graphs of FIGS. 8a and 8b compare the magnitude of distortion involved either when viewing a code with a fixed printed size from different angles (the perceived size changes, diamond points) or needed to obtain a code with a fixed perceived size at different angles (the physical size changes, triangular points). (Note: there is a vertical asymptote at 85.42° due to the particular settings.) We see that the distortion needed to maintain a perceived height is similar to the distortion of a fixed height for small angles, but becomes much larger for bigger angles. The impact of the angle on the elliptical distortion also grows as the angle increases as illustrated in FIG. 7. The half parameter of the ellipse depends on this formula:

$$b = d/2(r \sin \beta)/(d + r \cos \beta)$$

where b is the ellipse's vertical parameter, r is the diameter of the circle (diameter of the bottleneck), d is the distance from the view point to the border of the circle and $\beta = \pi/2 - \alpha$ ($\alpha$ is the angle from the normal to the surface and the view point). In the present test case (r=3.85, d=10), the variation of b according to a is nearly linear.

Inverse Deformation Tests

From the tests to correct fully the vertical compression, fully correcting the deformations in order to produce a perfectly square 2D barcode for a given angle is not the preferred approach. As explained earlier, the more specific the counter deformation, the lower the reading range will be because of the added distortions to the other angles. Hence, a preferred embodiment is to apply a counter deformation that corrects critical distortions and provides a large range of readability. 2D barcode readers typically deal with a certain amount of perspective distortion, so the main focus is to minimize the effect of the elliptical distortion such that the scanned 2D barcode approaches a 2D barcode that has gone through a perspective transformation.

A first transformation is applied to the generated 2D barcodes and deals with the horizontal compression effect caused by the rounded support. This transformation is basically a non-linear stretching of the code on the horizontal axis and will make the code appear straight when viewed from the 0° angle. In the described examples of specific bottles and given 2D barcode size, the stretching is minimal and represents a 3-4% total stretch (i.e. width becomes 4% larger than height).

Then in order to deal with the elliptical distortion, a first calculation is made to determine the parameters of the ellipse that appears when looking at the circle at the 2D barcode's center from a certain angle and distance. This ellipse is then used to determine the inverse vertical displacement that will produce straight lines for the given input view point.

Referring to FIG. 6, an algorithm describing how to generate a pre-compensated 2D barcode according to an embodiment of the invention is illustrated. The exemplary algorithm executed by a processor of a computing system has the following general steps:

Step S1) Obtain Input Parameters and Generate 2D Barcode Matrix

The parameters necessary for the generation of the 2D barcode matrix may be received from a memory of the computer system, or downloaded from a server, or input manually into the computing system, or any combination thereof.

These parameters may include:
The dimensions of the surface on which the 2D barcode in intended to be positioned, for instance the diameter of a bottle neck,
The dimensions and specifications of the 2D barcode (for instance width and height; size of the elementary cells of the code elements, number of elementary cells per horizontal line and per vertical line)
a printing resolution (for instance the dots per inch dpi)
a pre-defined scan viewing angle relative to the normal to the surface of the 2D barcode
a pre-defined perceived 2D barcode image width, namely the width the 2D barcode should visually have when applied to the curved surface
the distance from the camera to the 2D barcode The bit matrix of the 2D barcode can be generated by a standard barcode generator algorithm per se known, using parameters which may include:
the content of the barcode
the version of the barcode (which also defines its size in terms of elementary cells)
the error correction level The bit matrix may contain one bit per elementary cell and forms the base that is modified in the subsequent steps.

Generate a 2D Barcode that Compensates for the Bottleneck's Curvature Horizontally Step S2) Stretch the Image Horizontally This step performed by the algorithm involves calculating the horizontal cell sizes. In order to obtain a code element that is visually perceived as a square when applied to a curved surface and viewed from the normal to the surface, the physical size of the barcode's elementary cells must take into account the wrapping around the surface. This means determining the actual wrapped sizes of the uniformly-sized perceived cells. For each column of the 2D barcode's bit matrix, the width of the projection of the perceived cell size on the cylinder is calculated and may be stored in an array in a memory of the computer system or used directly to expand the initial bit matrix.

The inputs for this calculation may include:
the dimensions of the 2D barcode in terms of elementary cells.
the desired perceived size of the barcode
the dimensions of the surface, for instance the diameter of the bottleneck
the printing resolution Step S3) Stretch the Image Horizontally This step performed by the algorithm is to expand a bit matrix defining the horizontal and vertical positions (rows and columns) of elementary cells of the barcode, using the horizontal cell sizes obtained above. The bit matrix cells are scaled horizontally according to sizes that correspond their column position in the matrix. Cells at the horizontal ends (i.e. vertical outer edges of the barcode) will be larger than the cells in the middle of the barcode. Each cell is also scaled vertically, preferably by a fixed factor that is obtained by dividing the perceived vertical size of the 2D barcode by the number of rows of the initial bit matrix. The result produces an image that when applied to the surface and viewed from the normal (perpendicular) to the surface is perceived as square.

The above described steps S2 and S3 may be performed separately or may be performed at the same time.

Generate a 2D Barcode that Compensates the Distortions Due to a Given Viewing Angle Step S4) Calculate the Ellipse Parameters The parameters of the ellipse (width and height of the ellipse axes) that correspond to the intersection of a plane at the viewing angle with the cylindrical surface of the curved surface (e.g. bottle neck) are calculated by the algorithm. A cylindrical section viewed at a certain angle and distance has the shape of an ellipse. In this process step carried out by the algorithm, the parameters of the ellipse (half-height and half-width of the axes) are calculated taking into account values stored or entered in the computer system for the diameter of the surface, the viewing angle and the distance from the camera to the surface.

Step S5) Calculate Vertical Displacements

The pixel displacements in the vertical direction (y-displacements) for the image based on the calculated ellipse may then be calculated for each horizontal pixel position (for each x-position). Given the perceived ellipse's parameters, the vertical positions on the ellipse can be determined for all the positions on the horizontal axis in this step. These vertical positions may be used to compensate for the elliptical effect by shifting each of the extended 2D barcode columns obtained in step S2 by the vertical displacement corresponding to its horizontal position. These displacements may be pre-computed and kept in an array in a memory of the computer system or used directly to shift the extended 2D barcode.

Step S6) Distort the Image Vertically

The image may then be distorted vertically according to the pixel y-displacements.

In this process step performed by the algorithm, the extended 2D barcode obtained in step S2 is distorted thanks to the vertical displacements obtained for all its columns positions. Each column is shifted vertically which produces 2D barcodes with a convex top and matching concave bottom.

Step S7) Output the Image File

A 2D barcode image file may then be generated by the algorithm for printing or for generating a printing image based on the printing resolution parameter defined in step S1.

These steps are described in more detail herebelow by presenting the algorithm in pseudo-code. In the appendix the detailed algorithms are given for exemplary purposes, in the python programming language.

Main Flow
```
cell_widths=get_cell_widths_in_pixels_horizontal_stretch(
    . . . )
im_stretched=stretch_qr_horizontally( . . . , cell_widths)
ellipse_params=calculate_ellipse_params_center( . . . )
displacements=calculate_dy_displacements(el-
    lipse_params, . . . )
distorted_im=y_distort(displacements, im_stretched)
```
Let us now review the main functions.

Calculating cell sizes is done with function:
get_cell_widths_in_pixels_horizontal_stretch(qr_size, output_img_width, cylinder_diameter, resolution):
:param qr_size: number of cells of the QR on one axis (e.g. 33)
:param output_perceived_img_width: the width the code should visually have when applied to the cylinder
:param cylinder_diameter: the cylinder diameter (cm)
:param resolution: the printing resolution (dpi)
:return: a list of cell sizes which length matches the number of cells in the QR This function calculates the cell sizes in pixels for a cylinder so that the perceived code is square. For each cell on the x-axis, it calculates the width of its projection on the cylinder, then stores the result in array, and finally, return the array of lengths.

Stretching the image horizontally may be done with function:
stretch_qr_horizontally(qr_size, qr_matrix, pixel_lengths):
:param qr_size: number of cells of the QR on one axis (e.g. 33)
:param qr_matrix: binary matrix of size qr_size :param pixel_lengths: a list of the cell sizes(in pixels) of same length as the QR width
:return: an array that represents the stretched code The stretching on the x-axis will be done according to the provided lengths and on the y-axis the cells will be scaled by the middle length value. For each cell on the x-axis, it expands the cells of the column vertically by the middle value of pixel_lengths, it expands the cells of the column horizontally by the value of pixel_lengths that corresponds to the columns position. The function returns the new expanded array Calculating the ellipse parameters may be done with function:
calculate_ellipse_params_center(cylinder_diameter, capture_angle, distance):
:param cyl_diameter: the cylinder diameter (cm)
:param capture_angle: the angle at the normal of the camera and the QR (Radians)
:param distance: distance between the code and the camera along the normal (cm)
:return: the a and b ellipse's parameters (for: $(x/a)^2+(y/b)^2=1$)

This function calculates the parameters of the ellipse that appears when looking at a cut cylinder at a certain angle and distance.

Calculating the vertical displacements may be done with function:
calculate_dy_displacements(ellipse_params, output_img_width, resolution, cyl_diameter):
:param cyl_diameter: the cylinder_diameter (cm)
:param ellipse_params: the ellipse's parameters(a,b)
:param output_img_width: the image's width
:param resolution: the printing resolution (dpi)
:return: a list of y-axis displacements for all the columns of the image to match the ellipse's distortion This function calculates the pixel y-displacements for the image according to the given ellipse.

Distorting the image vertically may be done with the following function, which distorts the image in the y-direction.
y_distort(y_displacements, img):
:param y_displacements: y-axis displacement list(in pixels)
:param img: stretched image
:return: the distorted image Results

|  | Min angle | Max angle | range |
|---|---|---|---|
| normal code |  | −15 | 15 | 30 |
| pre-compensated - | 0 | −16 | 16 | 32 |
|  | 10 | −9 | 25 | 34 |
|  | 20 | −2 | 33 | 35 |
|  | 30 | 5 | 37 | 32 |
|  | 40 | 10 | 40 | 30 |
|  | 50 | 16 | 43 | 27 |
|  | 60 | 23 | 45 | 22 |

Table showing, for a normal QR Code, and different pre-compensated QR Codes, the minimum reading angle and maximum reading angle. The i-nigma scanning application on iPhone was used for testing.
perceived code size: 1.6 cm
support diameter: 3.088 cm
print resolution: 600 dpi
distance QR center to camera: 10 cm The results demonstrate that the pre-compensated codes may not only increase the reading range, but more importantly allow to increase the maximum reading angle. Even though it comes at the cost of a reduced minimal reading angle, for reasons explained above having a higher maximum reading angle is much more preferable from a user perspective. From the results, pre-compensated codes with input angles of 10 to 40 degrees appear to be particularly well suited for placement of 1.6 cm QR Codes on standard wine bottles with parameters above. Of course, the optimal range will depend on the QR Code size, support diameter, and other support and viewing parameters.

Reader and Optics Differences

The phone brand (and model) also plays a role in the codes' readability. The cause being the different cameras' specifications: the number of sensors, the differences in the image compression, the field of view, the zoom factor, output size, etc. However, for a global solution, one can determine optimal parameters by focusing on the mean reading results.

In further experiments, the results obtained with the conditions described above (i-nigma, iPhone) were compared with other reading conditions. The reading range varies depending both on the smartphone and the scanning software application that is used The reading ability of each scanning application depends on the algorithms that it uses to binarize, detect the alignment patterns and correct for the different deformations. Three scanning apps were tested: i-nigma, WeChat and Wochacha. Reliability and reproducibility of results are affected by slight variations that may be caused by: the precise camera positioning (angle-wise, distance-wise); the code positioning on the bottle, in particular the code may not have been stuck exactly at the right place and/or in a perfectly vertical position; the lighting conditions may differ from one test to the other; and possible variations and updates of the camera application version. However, it may be observed that this does not affect the choice of pre-compensated QR Codes, whereby for the above conditions pre-compensated codes with input angles 10 to 40 degrees function well.

APPENDIX—DETAILED ALGORITHMS FOR EXEMPLARY PURPOSES, IN THE PYTHON PROGRAMMING LANGUAGE

```
def generate_img(perceived_size, support_diameter,
print_res, distance_to_cam, angle_range, qr_content):
    qr=get_qr_code(qr_content, 1, 0)
    angle_rad=alpha*(math.pi/180)
    im_stretched=stretch_qr_horizontally(qr, get_cell
        _lengths_in_pixels_horizontal_stretch(qr, perceived
        _size,
        support_diameter,
        print_res))
    params=calculate_ellipse_params_center(support_diam
        eter, angle_rad, math.cos(angle_rad)*distance_to
        _cam)
    dy=calculate_dy_displacements(params, np.shape(im
        _stretched)[1], print_res, support_diameter)
    distorted_im=y_distort(dy, im_stretched)
def get_cell_lengths_in_pixels_horizontal_stretch(qr_ob
ject, output_img_width,
cylinder_diameter, resolution):
    """
    Calculates the cell sizes in pixels for a cylinder.
    :param qr_object: QRcodeClass instance
    :param output_img_width: the width the code should
        visually have when applied to the cylinder
    :param cylinder_diameter: the cylinder diameter (cm)
    :param resolution: the printing resolution (dpi)
    :return: a list of cell sizes which length matches the
        number of cells in the QR
    """
    radius=cylinder_diameter/2.0
    qr_size=qr_object.modules_count
    resolution_cm=resolution/2.54
    right_lengths=np.zeros(math.ceil(qr_size/2.0),
        dtype=np.int)
    # normalized step on half of the QR ((output_img_size/
        2)/radius)/(size_qr/2)
    step=output_img_width/(radius*qr_size)
    # QR codes always have an odd number of cells so we
        need to deal with the middle cell separately
    arc_length_0=(math.pi/2-math.a cos(step/2))*radius
    right_lengths[0]=round(2*arc_length_0*resolution_cm)
    for s in range(0, int(math.floor(qr_size/2.0))):
        alpha_start=math.a cos(s*step+step/2)
        alpha_end=math.a cos((s+1)*step+step/2)
        alpha_arc=alpha_start-alpha_end
        arc_length=alpha_arc*radius
        right_lengths[s+1]=round(arc_length*resolution_cm)
    left_lengths=right_lengths[1:]
    left_lengths=left_lengths[::-1]
    pixel_lengths=np.concatenate((left_lengths, right
        _lengths))
    return pixel_lengths
def stretch_qr_horizontally(qr_object, pixel_lengths):
    """
    Stretches a QR code. The stretching on the x-axis will be
        done according to the provided lengths and on the
        y-axis
    the cells will be scaled by the middle length value.
    :param qr_object: a QRcodeClass instance
    :param pixel_lengths: a list of the cell sizes(in pixels) of
        same length as the QR width
    :return: an array of bool that represents the stretched code
    """
    middle=qr_object.modules_count/2
    qr_array=np.array(qr_object.modules)
    out_img=[ ]
    for i in range(qr_object.modules_count):
        col=qr_array[:, i]
        if i==0:
            col_expanded=np.kron(col, np.ones(pixel_lengths
                [middle]))[np.newaxis]
            out_img=np.kron(col_expanded.T, np.ones(pixel
                _lengths[i]))
        else:
            col_expanded=np.kron(col, np.ones(pixel_lengths
                [middle]))[np.newaxis]
            out_img=np.concatenate((out_img, np.kron(col_ex
                panded.T, np.ones(pixel_lengths[i]))), axis=1)
    return np.bitwise_not(out_img, dtype=bool)
def calculate_ellipse_params_center(cyl_diameter, capture
_angle, distance):
    """
    Calculates the parameters of the ellipse that appears when
        looking at a cut cylinder at a certain angle and distance
        (see attached illustration)
    :param cyl_diameter: the cylinder diameter (cm)
    :param capture_angle: the angle at the normal of the
        camera and the QR (Radians)
```

```
:param distance: distance between the code and the cam-
    era along the normal (cm)
:return: the a and b ellipse's parameters (for: (x/a)^2+(y/
    b)^2=1)
"""
# opposite of the given angle. Is the angle between the line
    from the cam. to the QR's center on the cylinder,
# and the line parallel to the cylinders surface going
    through the camera point
alpha=(math.pi/2)-capture_angle
# height of the camera from the normal at the QR's center
height_cam_code_center=math.tan(capture_angle)*dis-
    tance
I=distance/math.sin(alpha) # distance between the camera
    point and the QR's center
# angle btw the lines cam-(back of the cylinder) and the
    same parallel line as above
if height_cam_code_center==0:
    beta=alpha
else:
    beta=math.a tan((distance+cyl_diameter)/height_cam-
        _code_center)
gamma=abs(beta-alpha)
h=math.tan(abs(gamma))*I # perceived height between
    the front and back of the cylinder circle
# could also have been calculated thanks to the similar
    triangle formula
# (r*cos(x)+d)/d=(r*sin(x))/h so h=d*(r*sin(x))/(r*cos
    (x)+d)
# in this case r=cyl_diameter/2 and d=I=distance/math.sin
    (alpha)
b=h/2.0
a=cyl_diameter/2.0
return [a, b]
def   calculate_dy_displacements(ellipse_params,    out-
put_img_width, resolution, cyl_diameter):
"""
    Calculates the pixel y-displacements for the image
        according to the given ellipse
    :param cyl_diameter: the cylinder_diameter (cm)
    :param ellipse_params: the ellipse's parameters(a,b)
    :param output_img_width: the image's width
    :param resolution: the printing resolution (dpi)
    :return: a list of y-axis displacements for all the columns
        of the image to match the ellipse's distortion
"""
    half_size=int(round(output_img_width/2.0))
    right_delta_ys=np.zeros(half_size)
    dots_per_cm=resolution/2.54
    dot_in_cm=2.54/resolution #1 cm/(resolution/2.54)
    radius=cyl_diameter/2.0
    # a distinction must be made for the odd and even cases
    x_shift=0
    if output_img_width % 2==0:
        x_shift=0.5
    for i in range(half_size):
        # x needs to be define on the ellipse(the columns don't
            have a uniform x step on the ellipse)
        # I=arc length from center to i(position from the center
            when the code is laid flat out in uniform steps)
        I=dot_in_cm*(i+x_shift)
        alpha=I/radius # corresponding angle on the circle
        x=radius*abs(math.cos(math.pi/2-alpha)) # x position
            on the ellipse in cm
        # y position on the ellipse in cm
        y=ellipse_params[1]*math.sqrt(1-math.pow(x/el-
            lipse_params[0], 2))
        right_delta_ys[i]=int(round(dots_per_cm*(el-
            lipse_params[1]-y)))
    if output_img_width % 2==0:
        left_delta_ys=right_delta_ys[::-1]
    else:
        left_delta_ys=right_delta_ys[1:]
        left_delta_ys=left_delta_ys[::-1]
    deltas=np.concatenate((left_delta_ys, right_delta_ys))
    return deltas
def y_distort(y_displ, img):
"""
    Distorts an image in the y-direction
    :param y_displ: y-axis displacement list(in pixels)
    :param img: stretched image
    :return: the distorted image
"""
    s=np.shape(img)
    output_img=np.ones((s[0]+y_displ[0], s[1]))
    for i in range(s[1]):
        # index=dy[0]-dy[i]
        index=y_displ[i]
        output_img[index:(index+s[0]), i]=img[:, i]
    return output_img
```

The invention claimed is:

1. Two dimensional barcode for placement on a portion of a neck of a bottle, comprising a top edge, a bottom edge, a left edge a right edge, and code elements arranged along horizontal lines extending between the left edge and the right edge, wherein the horizontal lines of code elements and the top and bottom edges are curved such that the top edge has a convex shape and the bottom edge a concave shape.

2. Two dimensional barcode according to claim 1, wherein the curve of the lines of code elements and the top and bottom edges is shaped substantially as a portion of an ellipse.

3. Two dimensional barcode according to claim 1, wherein the bottom edge is longer than the top edge.

4. Two dimensional barcode according to claim 1, wherein the degree of curvature of the lines of code elements and the top and bottom edges is configured for a diameter of the portion of the neck of the bottle, a greater curvature being provided for a smaller diameter.

5. Two dimensional barcode according to claim 1, wherein the 2D barcode comprises a support on which the code elements are printed.

6. Two dimensional barcode according to claim 5, wherein the support comprises an adhesive layer on a side of the support opposite a side on which the code elements are printed.

7. Two dimensional barcode according to claim 6, wherein the support comprises paper or a flexible polymer.

8. Two dimensional barcode according to claim 1, wherein each of the top, bottom, right and left edges have a length inferior to 26 mm.

9. Two dimensional barcode according to claim 1, comprising a global deformation described by the following formulas:

$$s = \frac{\frac{2d^2}{h}\sin(\beta)}{\left(\frac{d}{h}\right)^2 \sin(\beta)^2 - \cos(\beta)^2}$$

where s is the 2D barcode's physical printed height, h is the perceived height of the 2D barcode, d is the distance from a pre-defined scanner view point, and $\beta=\pi/2-\alpha$, where $\alpha$ is the angle between a normal N to the surface of the 2D barcode and said pre-defined scanner view point.

10. Bottle comprising a two dimensional barcode according to claim 1, wherein the two dimensional barcode is bonded on a portion of the neck of the bottle.

11. Bottle according to claim 10 wherein the portion of the neck of the bottle is substantially cylindrical or conical.

12. Bottle according to claim 10 wherein the portion of the neck of the bottle is substantially conically and concavely curved.

13. Bottle according to claim 10 wherein the two dimensional barcode is placed on a base portion of the neck of the bottle distal from a pouring end of the neck of the bottle.

14. Method of generating an image of a two dimensional barcode for placement on a curved surface such as a portion of a neck of a bottle, the two dimensional barcode comprising a top edge, a bottom edge, a left edge a right edge, and code elements arranged along horizontal lines extending between the left edge and the right edge, the horizontal lines of code elements and the top and bottom edges being curved such that the top edge has a convex shape and the bottom edge a concave shape, the method comprising the following steps executed by an algorithm in a computing system:

(S1)—receiving from a memory in the computing system or from an external computing system or from manual input of data into the computing system, or any combination thereof, dimensional parameters of said two dimensional barcode prior to deformation and an input image of said two dimensional barcode prior to deformation, (S2)— calculating elementary cell sizes of the code elements so that the code element is visually perceived as a square when viewed from the predefined viewing angle in a vertical plane taking into account the diameter of the curved surface, (S3)—stretching, by means of an algorithm, the input image horizontally by scaling horizontally cells of a bit matrix of the 2D barcode according to sizes that correspond to column positions of said cells in the bit matrix, whereby cells at horizontal ends of the 2D barcode are larger than the cells in the middle of the 2D barcode, (S4) calculating ellipse deformation parameters that correspond to the intersection of a plane at the viewing angle with curved surface, (S5) calculating vertical displacements of pixels of the image based on the calculated ellipse deformation parameters, (S6)—distorting the stretched input image based on the ellipse deformation parameters and the vertical displacement, (S7)—outputting the image of said two dimensional barcode (4) for generating a printing file.

15. Method according to claim 14, wherein in step S3 each cell is also scaled vertically by a fixed factor obtained by dividing the perceived vertical size of the 2D barcode by the number of rows of the initial bit matrix.

* * * * *